United States Patent
Johnson

(10) Patent No.: US 10,179,586 B2
(45) Date of Patent: Jan. 15, 2019

(54) USING INFORMATION OBTAINED FROM FLEET OF VEHICLES FOR INFORMATIONAL DISPLAY AND CONTROL OF AN AUTONOMOUS VEHICLE

(71) Applicant: Toyota Motor Engineering & Manufacturing North America, Inc., Erlanger, KY (US)

(72) Inventor: Miles J. Johnson, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 20 days.

(21) Appl. No.: 15/234,887

(22) Filed: Aug. 11, 2016

(65) Prior Publication Data

US 2018/0047285 A1    Feb. 15, 2018

(51) Int. Cl.
| | |
|---|---|
| *B60W 30/08* | (2012.01) |
| *B60W 50/14* | (2012.01) |
| *B60W 50/08* | (2012.01) |
| *G08G 1/0967* | (2006.01) |
| *G08G 1/16* | (2006.01) |
| *G07C 5/00* | (2006.01) |

(Continued)

(52) U.S. Cl.
CPC .......... *B60W 30/08* (2013.01); *B60W 50/082* (2013.01); *B60W 50/14* (2013.01); *G07C 5/008* (2013.01); *G07C 5/0825* (2013.01); *G08G 1/0112* (2013.01); *G08G 1/0129* (2013.01); *G08G 1/0141* (2013.01); *G08G 1/096716* (2013.01); *G08G 1/096725* (2013.01); *G08G 1/096741* (2013.01); *G08G 1/096775* (2013.01); *G08G 1/164* (2013.01); *G08G 1/165* (2013.01); *B60W 2050/143* (2013.01); *B60W 2050/146* (2013.01); *B60W 2550/10* (2013.01)

(58) Field of Classification Search
CPC .... G08G 1/20; G08G 1/164; G08G 1/096708; G08G 1/096775; B60W 30/08; B60W 50/082; B60W 50/14; B60W 2050/143; B60W 2050/146; B60W 2550/10
See application file for complete search history.

(56) References Cited

U.S. PATENT DOCUMENTS

| | | | |
|---|---|---|---|
| 8,862,321 B2 * | 10/2014 | Moshchuk | B62D 5/0463 701/40 |
| 9,045,041 B2 | 6/2015 | Dorum et al. | |
| 9,120,484 B1 * | 9/2015 | Ferguson | G05D 1/0055 |

(Continued)

FOREIGN PATENT DOCUMENTS

| | | |
|---|---|---|
| JP | 2006313519 A | 11/2006 |
| JP | 2008234044 A | 10/2008 |
| JP | 2015064786 A | 4/2015 |

*Primary Examiner* — Rachid Bendidi
(74) *Attorney, Agent, or Firm* — Christopher G. Darrow; Darrow Mustafa PC

(57) ABSTRACT

Described herein is an electronic control unit in an autonomous vehicle. The electronic control unit may comprise: a memory; and a processor coupled to the memory. The processor may be configured to: detect a first obstacle; determine first data related to the first obstacle; transmit the first data to a data aggregation service; receive, from the data aggregation service, second data related to a second obstacle; create a notification of the second obstacle; and deliver the notification to an interior of the autonomous vehicle.

11 Claims, 3 Drawing Sheets

(51) Int. Cl.
*G08G 1/01* (2006.01)
*G07C 5/08* (2006.01)

(56) References Cited

U.S. PATENT DOCUMENTS

| | | | |
|---|---|---|---|
| 9,201,421 B1* | 12/2015 | Fairfield | B60W 40/04 |
| 9,240,082 B2 | 1/2016 | Marathe et al. | |
| 9,563,199 B1* | 2/2017 | Ferguson | B60W 40/04 |
| 9,632,502 B1* | 4/2017 | Levinson | G05D 1/0027 |
| 9,646,428 B1* | 5/2017 | Konrardy | G07C 5/08 |
| 9,754,325 B1* | 9/2017 | Konrardy | G06Q 40/08 |
| 9,754,490 B2* | 9/2017 | Kentley | G08G 1/202 |
| 9,767,516 B1* | 9/2017 | Konrardy | G06Q 40/08 |
| 9,953,535 B1* | 4/2018 | Canavor | H04W 4/70 |
| 2013/0054050 A1 | 2/2013 | Filev et al. | |
| 2017/0123419 A1* | 5/2017 | Levinson | G05D 1/0027 |
| 2017/0132334 A1* | 5/2017 | Levinson | G06F 17/5009 |
| 2017/0235305 A1* | 8/2017 | Jung | B60W 40/072 |
| | | | 701/23 |

* cited by examiner

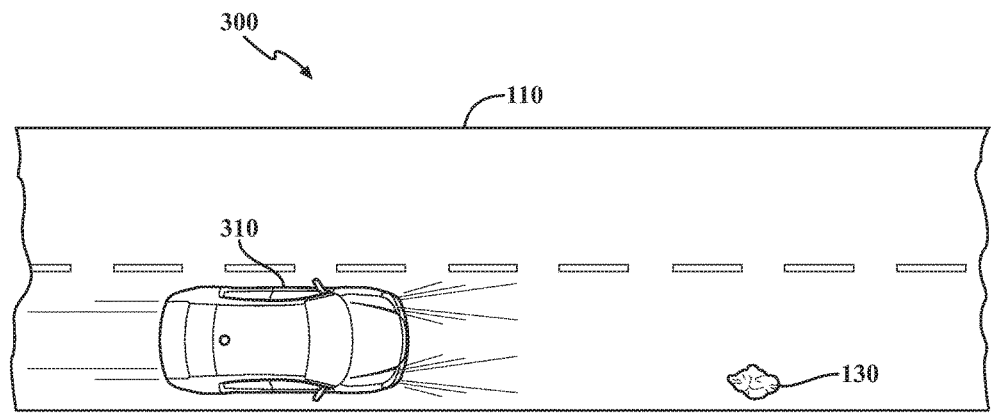
FIG. 3
FIG. 4
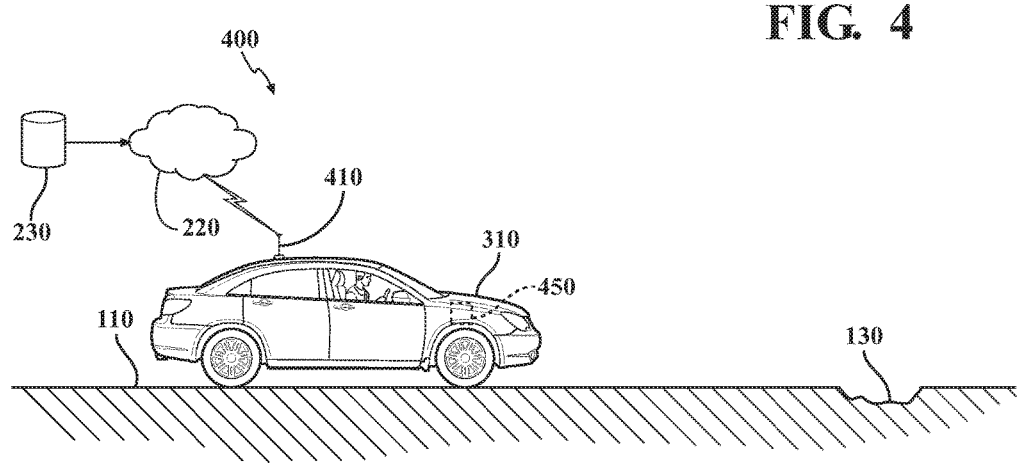

US 10,179,586 B2

USING INFORMATION OBTAINED FROM FLEET OF VEHICLES FOR INFORMATIONAL DISPLAY AND CONTROL OF AN AUTONOMOUS VEHICLE

TECHNICAL FIELD

The subject matter described herein relates in general to vehicles and, more particularly, to using information obtained from a fleet of vehicles for informational display and control of an autonomous vehicle.

BACKGROUND

Vehicles often encounter obstacles while driving. Obstacles include potholes, debris in the road, missing lane markers, or any other thing that could cause a vehicle to alter its present operating conditions. Some vehicles may operate autonomously. Autonomous mode can include a system that fully controls all aspects of the operation of the vehicle. Autonomous mode can also include systems that assist a driver, for example adaptive cruise control, parking assist, lane departure warning systems, blind spot monitors, or any other advanced driver assistance system (ADAS).

SUMMARY

Described herein is an electronic control unit in an autonomous vehicle, the electronic control unit comprising: a memory; and a processor coupled to the memory. The processor configured to: detect a first obstacle; determine first data related to the first obstacle; transmit the first data to a data aggregation service; receive, from the data aggregation service, second data related to a second obstacle; create a notification of the second obstacle; and deliver the notification to an interior of the autonomous vehicle.

Described herein is a method for informational display in an autonomous vehicle. The method comprising: detecting a first obstacle; determining, by an electronic control unit, first data related to the first obstacle; transmitting the first data to a data aggregation service; receiving, by the electronic control unit from the data aggregation service, second data related to a second obstacle; creating a notification of the second obstacle; and delivering the notification to an interior of the autonomous vehicle.

Described herein is an autonomous vehicle comprising: a wireless communication device; a sensor; an electronic control unit in communication with the sensor. The electronic control unit configured to: detect a first obstacle; determine first data related to the first obstacle; and transmit, via the wireless communication device, the first data to a data aggregation service.

BRIEF DESCRIPTION OF THE DRAWINGS

FIG. 3 is a diagram of an embodiment of a vehicle approaching an obstacle.

FIG. 4 is a diagram of an embodiment of a vehicle receiving notification of an obstacle.

DETAILED DESCRIPTION

In an embodiment described herein, an autonomous vehicle may encounter an obstacle while driving. An obstacle may include any static or dynamic feature of the local environment around the autonomous vehicle that would cause the autonomous vehicle to change its present operating condition. When the autonomous vehicle encounters an obstacle, the autonomous vehicle may exit autonomous mode. Either the vehicle may determine to warn the driver and disengage automation or a driver may decide to take control of the vehicle based on the upcoming obstacle. In some cases the autonomous vehicle may take an autonomous action to circumvent the obstacle. After the autonomous vehicle encounters the obstacle, the autonomous vehicle may report the location of the obstacle and/or other data related to the obstacle to a data aggregation system. In some cases, a vehicle that is sensing the surrounding environment but not operating autonomously may also encounter an obstacle. The vehicle not operating autonomously may also report the location of the obstacle and/or other data related to the obstacle to a data aggregation system.

The data aggregation system may receive reports of obstacles and associated data. The data aggregation system aggregate multiple reports related to obstacles and create a listing of obstacles and their locations, and in some cases actions to take when approaching an obstacle. When a vehicle is approaching an area where an obstacle is present, the data aggregation system may transmit data related to the obstacle to the vehicle. In some cases, the vehicle may transmit its location to the data aggregation systems and the data aggregation system may send data about obstacles near the vehicle. In other cases, the data aggregation system may monitor the location of a vehicle and push the obstacle data to the vehicle when the vehicle approaches the obstacle.

As the vehicle approaches the obstacle, an electronic control unit (ECU) or some other system in the vehicle may generate a notification of the upcoming obstacle. The notification may be transmitted to the interior of the vehicle. The notification may be audible, visual, or both. In some embodiments, an autonomous vehicle may automatically take an action based on the notification and the upcoming obstacle. In other embodiments, the driver may take an action based on the notification. In other embodiments, the vehicle may exit autonomous mode based on the notification.

Figure 1:
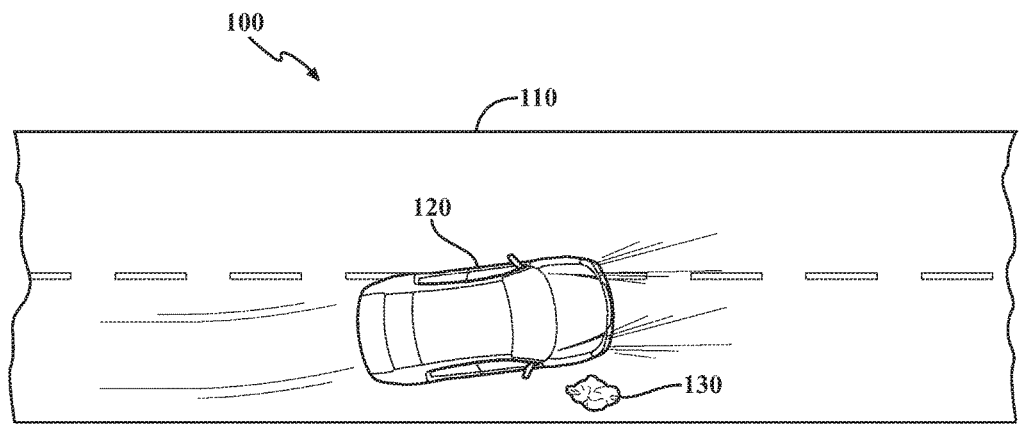
FIG. 1 is a diagram of an embodiment of a vehicle avoiding an obstacle.

FIG. 1 is a diagram 100 of an embodiment of a vehicle 120 avoiding an obstacle 130. In embodiment, vehicle 120 may be traveling on road 110. Vehicle 120 may be operating in an autonomous mode. Autonomous mode may include the vehicle controlling all aspects of driving, an adaptive cruise control (ACC), collision avoidance, steering assist, other types of advanced driver assistance systems (ADAS), or any other mode where the vehicle 120 assists the driver in controlling vehicle 120. As vehicle 120 approaches obstacle 130, a driver of the vehicle 120 may cause vehicle 120 to exit autonomous mode and enter a manual control mode in order to avoid the obstacle 130. In another embodiment, vehicle 120 may determine that it can no longer operate safely in an autonomous mode and notify the driver that it will be entering manual control. In either case, the vehicle 120 exits autonomous mode. Obstacle 130 may be anything in the road 110, e.g., a pothole or debris. Obstacle 130 may also include deficiencies in the road, e.g., missing lane markers, lane markers out of place, etc. Obstacle 130 may further include anything the vehicle 120 encounters that may cause vehicle 120 to exit autonomous mode. Vehicle 120 may exit autonomous mode based on input from the driver or based upon a decision by the vehicle 120.

Figure 2:
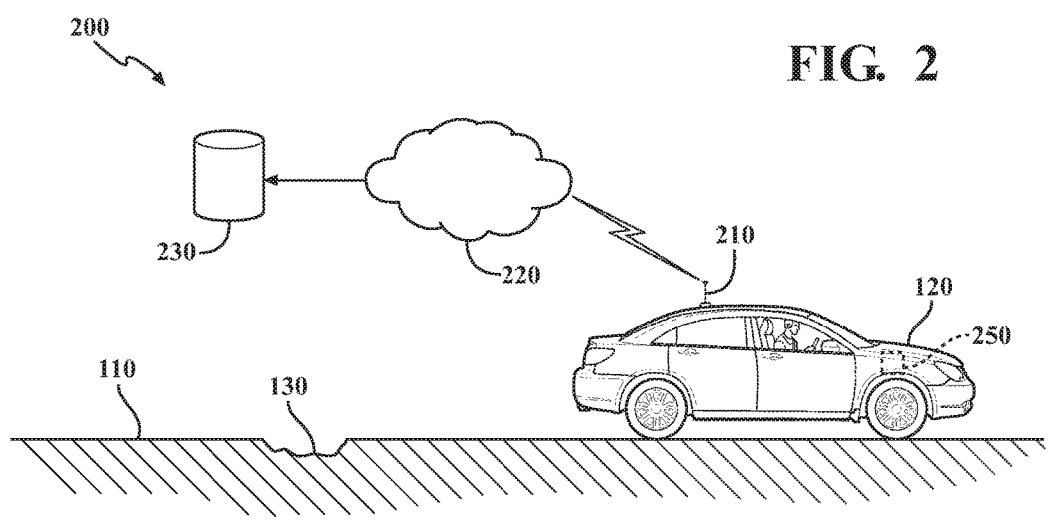
FIG. 2 is a diagram of an embodiment of a vehicle after encountering an obstacle.

FIG. 2 is a diagram 200 of an embodiment of a vehicle 120 after encountering obstacle 130. Vehicle 120 may have an electronic control unit (ECU) 250. ECU 250 may interact with various systems of vehicle 120. ECU 250 may be configured to gather data from systems of vehicle 120. The systems may include location tracking systems, guidance systems, and/or various sensors. The sensors may include cameras that capture images of obstacle 130 and/or other signal based sensors that detect obstacle 130, e.g., radar, LIDAR, etc. ECU 250 way detect that the vehicle 120 exited autonomous mode. ECU 250 may gather data related to the location and actions taken when vehicle 120 exited autonomous mode. For example, ECU 250 may determine that the vehicle 120 left autonomous mode at the request of the driver and swerved to avoid obstacle 130. Vehicle 120 may have an antenna 210 for wireless transmission. ECU 250 may transmit the data related to exiting autonomous mode to a data aggregation service 230 via antenna 210 and internet 220. The data related to exiting autonomous mode may include the location of the vehicle when it exited autonomous mode and/or or the location of the obstacle 130. The data related to exiting autonomous mode may include a description of obstacle 130, the description may include characteristics of the obstacle 130 and/or an image of obstacle 130. In an embodiment, the ECU 250 may be configured to transmit the data related to exiting autonomous mode via a mobile device or other device capable of wireless transmission, e.g., a cell phone, of an occupant of the vehicle 120.

Data aggregation service 230 may be configured to receive data related to exiting autonomous mode from vehicle 120 and other vehicles. The data may be received from any vehicle configured to transmit data related to exiting autonomous mode. In addition, other vehicles that are not exiting autonomous mode that detect an obstacle may also provide data related to the obstacle 130 and actions taken in response to encountering the obstacle 130. Data aggregation service 230 may receive the data related to exiting autonomous mode, data related to obstacles, and data related to actions taken in response to encountering the obstacle and aggregate as necessary. The data aggregation service 230 may create a listing of locations of obstacles and actions that may be associated with the obstacles. The actions to be taken may be determined by analyzing images of obstacles transmitted from vehicles. The actions may also be determined based upon the action taken by vehicles encountering the obstacles.

The data aggregation service 230 may also determine whether data related to each of the tracked obstacles is accurate. Accuracy may be based on the freshness of data related to an obstacle. Accuracy may also be based on the volume of data related to an obstacle. For example, data may be considered more accurate if there is more than one report related to a particular obstacle, e.g., ten vehicles have reported data related to the particular obstacle. As another example, data may be considered more accurate if the data is fresh, e.g., the data has been reported more recently than a threshold for freshness. In yet another example, a combination of freshness and volume may be used in determining accuracy. If data related to an obstacle is determined to be stale, the data related to the obstacle may be removed from data aggregation service 230. For example, a pothole may be patched, and vehicles may stop reporting the presence of the pothole. After a certain amount of time, the data related to the pothole is considered stale and may be deleted.

FIG. 3 is a diagram 300 of an embodiment of a vehicle 310 approaching obstacle 130. In embodiment, vehicle 310 may be traveling on road 110. Vehicle 310 may be operating in an autonomous mode. Vehicle 310 may be traveling on road 110 after vehicle 120 and/or other vehicles have traveled road 110 and transmitted details of obstacle 130 to data aggregation service 230.

FIG. 4 is a diagram 400 of an embodiment of a vehicle 310 receiving notification of obstacle 130. As vehicle 310 approaches obstacle 130, data aggregation system 230 may transit a notification message to the vehicle 310 to notify of the upcoming obstacle 130. In an embodiment, a notification service may track the location of vehicle 310 and interact with data aggregation service 230 to find obstacles in an area near vehicle 310. The area may be a radius around the vehicle 310, a distance along the road 110 that vehicle 310 is traveling, or some other area that may contain obstacles. The notification service may be part of ECU 450, an independent system in vehicle 310, or part of some system external to the vehicle 310. The notification service may not retrieve data if it has low accuracy.

The message may be transmitted wirelessly via internet 220 and received by vehicle 310 via antenna 410. The message may be received by ECU 450. The message may include the location of obstacle 130. The message may also include the type of obstacle and/or an action to take in dealing with the obstacle 130. In some cases, the action may be to disengage autonomous mode. In other cases, the action may be to swerve or take some other autonomous action to avoid obstacle 130.

In an embodiment, a vehicle may receive a notification from data aggregation service 230. The vehicle may reach the location of the obstacle identified in the notification. At the identified location, the vehicle may determine the obstacle is no longer present. For example, a pothole may be patched, or new lane indicators may be painted. The vehicle may use various sensors to detect the absence of the obstacle, or the driver of the vehicle may determine the obstacle is no longer present and override the notification or respond to the notification indicating that the obstacle is no longer present. Upon determining the obstacle is no longer present, the vehicle may notify data aggregation service 230. Upon receiving a message that an obstacle is no longer present, the data aggregation service 230 may remove that obstacle from the aggregated data.

Figure 5:
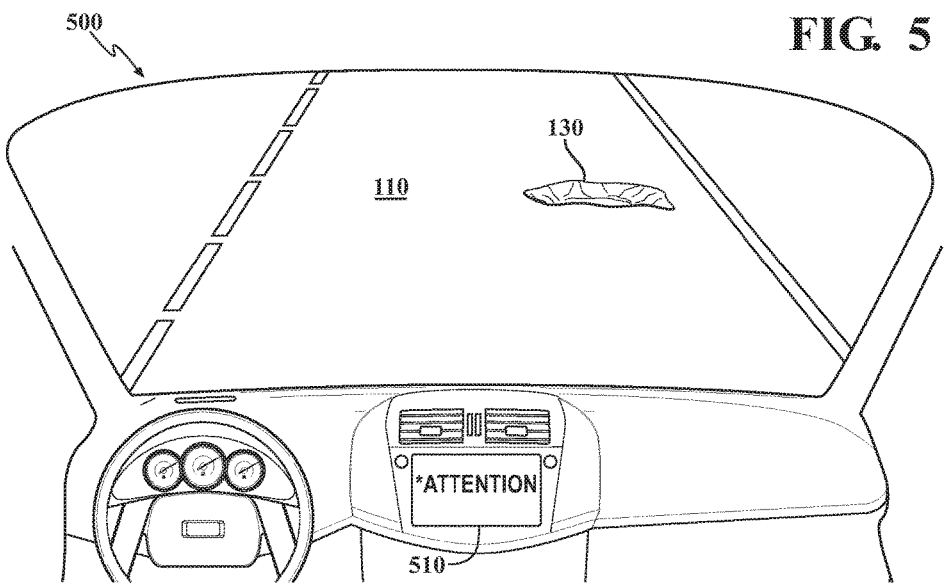
FIG. 5 is a diagram of an embodiment of an interior of a vehicle approaching an obstacle.

FIG. 5 is a diagram of an embodiment of an interior 500 of vehicle 310. Obstacle 130 may be ahead of vehicle 310. The ECU 450 or notification system may cause an alert 510 to be displayed to a driver of the vehicle. In other embodiments, the alert 510 may be audible or both audible and visual. In some embodiments, the ECU 450 may cause the vehicle 310 to disengage autonomous mode based on the message. The ECU 450 may also cause the vehicle to react autonomously to the obstacle 130 based on the notification message. The alert 510 may notify the driver that obstacle 130 is ahead. The alert may also notify the driver that the car will exit autonomous mode or take some sort of autonomous action in response to obstacle 130.

Figure 6:
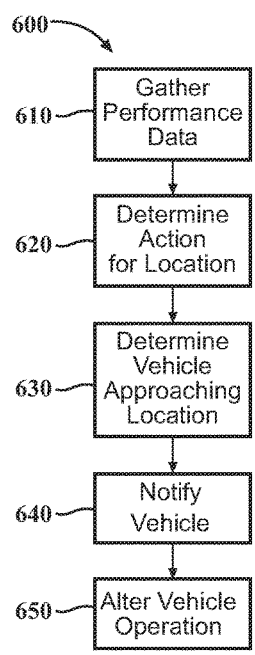
FIG. 6 is a flow diagram of an embodiment of a method for gathering obstacle data and providing obstacle notifications.

FIG. 6 is a flow diagram of an embodiment of a method 600 for gathering obstacle data and providing obstacle notifications. The method 600 may begin at block 610 when performance data is gathered from a vehicle, e.g., vehicle 120. Performance data may include, but is not limited to: automatic disengagement of autonomous driving, e.g., the vehicle decides it cannot continue in autonomous mode; manual disengagement of autonomous driving, e.g., the driver decides to not continue in autonomous mode; actions taken following disengagement of autonomous mode; actions taken after detection of an obstacle; detection of an obstacle; or any combination thereof. The performance data may be gathered from many vehicles. The performance data may be gathered by a data aggregation system, e.g., data aggregation system 230, and may be aggregated. The data may be aggregated for each reported obstacle.

The method may continue when an action is determined for a given location at block 620. The location may be a location where an obstacle is present. The location may be determined based on location information transmitted to the data aggregation system from vehicles that encounter an obstacle, e.g., obstacle 130. The action may include but is not limited to sending a notification; disengaging autonomous mode; and/or to taking an autonomous action based on the obstacle.

At block 630 a determination may be made that a vehicle, e.g., vehicle 310 is approaching a location with an obstacle. In an embodiment, the vehicle may communicate with the data aggregation service and request data related to any obstacles in the area surrounding the vehicle. The vehicle may receive data from the data aggregation service and store all or a portion of the received data locally. In another embodiment, a vehicle notification service external to the vehicle may monitor the vehicle's location and push data about upcoming obstacles to the vehicle based upon the vehicle's location.

The method may continue with block 640 when the vehicle is notified of the upcoming obstacle. The notification may be similar to alert 510. The notification may be audible, visible, or both. The notification may include any combination of a warning of an upcoming obstacle, a notification of an action the vehicle may take to avoid the obstacle, and/or a notification that the car may exit autonomous mode.

The method may continue with block 650. Block 650 may be optional. At block 650 the vehicle may alter operation based upon the upcoming obstacle. For example, the vehicle may exit autonomous mode, swerve to avoid the obstacle, or take some other action based upon the upcoming obstacle. A driver may choose to enable or disable automatic response to obstacles.

Figure 7:
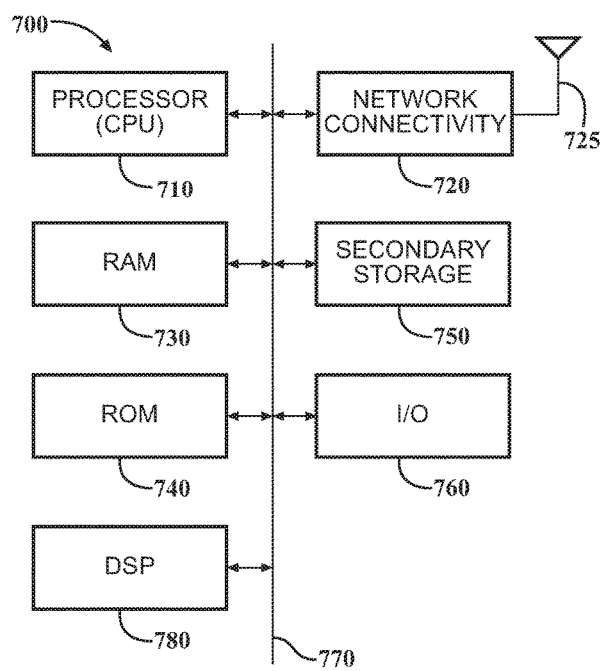
FIG. 7 is a diagram of an embodiment of a system for using information obtained from fleet of vehicles for informational display and control of an autonomous vehicle.

FIG. 7 illustrates an example of a system 700 that includes a processor 710 suitable for implementing one or more embodiments disclosed herein. The processor 710 may control the overall operation of the system. In an embodiment, system 700 may include all or part of ECU 250 and ECU 450.

In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a digital signal processor (DSP) 780. Although the DSP 780 is shown as a separate component, the DSP 780 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips and may be a hardware device capable of executing computer instructions.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 725 might be considered to be a component of the I/O devices 760 instead of or in addition to being a component of the network connectivity devices 720.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. An electronic control unit in an autonomous vehicle, the electronic control unit comprising:
a memory; and
a processor coupled to the memory, the processor configured to:
receive, from a data aggregation service, data related to an obstacle detected by at least one other vehicle, the obstacle detected while travelling during an autonomous driving mode and data indicative of the location of a disengagement of the at least one other vehicle from the autonomous driving mode to a non-autonomous driving mode, a type of the disengagement, the type being one of manual and automatic, and one or more actions taken by the at least one other vehicle following the disengagement of the autonomous driving mode, wherein the one or more actions include avoiding the obstacle;
determine whether the obstacle is still present based on the received data related to the obstacle; and
control the autonomous vehicle to take an action with respect to the obstacle based on the location of disengagement of the at least one other vehicle from the autonomous driving mode to the non-autonomous driving mode, the type of the disengagement and the one or more actions taken by the at least one other vehicle following disengagement of the autonomous driving mode if the obstacle is determined to still be present.

2. The electronic control unit of claim 1, wherein the data related to the obstacle detected by at least one other vehicle comprises a location of the obstacle and a description of the obstacle.

3. A method for controlling an autonomous vehicle, the method comprising:
receiving, by an electronic control unit from a data aggregation service, data related to an obstacle detected by at least one other vehicle, the obstacle detected while travelling during an autonomous driving mode and data indicative of the location of a disengagement of the at least one other vehicle from the autonomous driving mode to a non-autonomous driving mode, a type of the disengagement, the type being one of manual and automatic, and one or more actions taken by the at least one other vehicle following the disengagement of the autonomous driving mode, wherein the one or more actions include avoiding the obstacle;
determining whether the obstacle is still present based on the received data related to the obstacle; and
controlling the autonomous vehicle to take an action with respect to the obstacle based on the location of disengagement of the at least one other vehicle from the autonomous driving mode to the non-autonomous driving mode, the type of the disengagement and the one or more actions taken by the at least one other vehicle following disengagement of the autonomous driving mode if the obstacle is determined to still be present.

4. The method of claim 3, wherein the data related to the obstacle detected by at least one other vehicle comprises a location of the obstacle and a description of the obstacle.

5. An autonomous vehicle comprising:
a wireless communication device;
a sensor; and
an electronic control unit in communication with the sensor, the electronic control unit configured to:
detect an obstacle, the obstacle detected while travelling during an autonomous driving mode;
determine data related to the obstacle;
transmit, via the wireless communication device, the data to a data aggregation service, the data related to the detected obstacle and data indicative of the location of a disengagement of the autonomous vehicle from the autonomous driving mode to a non-autonomous driving mode, a type of the disengagement, the type being one of manual and automatic, and one or more actions taken by the autonomous vehicle following the disengagement of the autonomous driving mode, wherein the one or more actions taken by the autonomous vehicle include avoiding the second obstacle;

receive, from the data aggregation service via the wireless communication device, second data related to a second obstacle detected by at least one other vehicle, the second obstacle detected while travelling during an autonomous driving mode and data relating to the location of a disengagement of the at least one other vehicle from the autonomous driving mode to a non-autonomous driving mode, a type of the disengagement, the type being one of manual and automatic, and one or more actions taken by the at least one other vehicle following the disengagement of the autonomous driving mode, wherein the one or more actions taken by the at least one other vehicle include avoiding the second obstacle;

create a notification of the second obstacle; and deliver the notification to an interior of the autonomous vehicle.

6. The autonomous vehicle of claim 5, wherein the data comprises a location of the obstacle and a description of the obstacle.

7. The autonomous vehicle of claim 6, wherein the sensor is configured to capture an image of the obstacle, and wherein the description is based, at least in part, on the image.

8. The autonomous vehicle of claim 5, wherein the electronic control unit is further configured to determine an expected location of the second obstacle based, at least in part, on the second data.

9. The autonomous vehicle of claim 8, wherein the electronic control unit is further configured to cause the autonomous vehicle to take an action in response to approaching the expected location of the second obstacle based on the location of disengagement of the at least one other vehicle from the autonomous driving mode to the non-autonomous driving mode, the type of the disengagement and the one or more actions taken by the at least one other vehicle following disengagement of the autonomous driving mode.

10. The autonomous vehicle of claim 8, wherein the electronic control unit is further configured to:

determine absence of the second obstacle at the expected location of the second obstacle; and transmit a message to the data aggregation service, the message indicating the absence of the second obstacle at the expected location of the second obstacle.

11. The autonomous vehicle of claim 5, wherein the notification comprises one or more of: an audible notification and a visual notification.

* * * * *